US012124811B2

(12) United States Patent
Carbajales et al.

(10) Patent No.: US 12,124,811 B2
(45) Date of Patent: Oct. 22, 2024

(54) GENERATING AND UPDATING CONVERSATIONAL ARTIFACTS FROM APIS

(71) Applicant: INTERNATIONAL BUSINESS MACHINES CORPORATION, Armonk, NY (US)

(72) Inventors: Sebastian Carbajales, Toronto (CA); Yara Rizk, Cambridge, MA (US); Vinod Muthusamy, Austin, TX (US); Vatche Isahagian, Belmont, MA (US); Kushal Mukherjee, New Delhi (IN); Siyu Huo, White Plains, NY (US); Prabhat Maddikunta Reddy, Danbury, CT (US); Dario Andres Silva Moran, Buenos Aires (AR); Allen Vi Cuong Chan, Markham (CA)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 17/454,302

(22) Filed: Nov. 10, 2021

(65) Prior Publication Data
US 2023/0153541 A1 May 18, 2023

(51) Int. Cl.
G06F 40/40 (2020.01)
G06F 18/21 (2023.01)
G06F 18/214 (2023.01)
G06F 40/205 (2020.01)
G06N 3/02 (2006.01)
G06N 3/08 (2023.01)

(52) U.S. Cl.
CPC ............ *G06F 40/40* (2020.01); *G06F 18/214* (2023.01); *G06F 18/2178* (2023.01); *G06F 40/205* (2020.01); *G06N 3/02* (2013.01); *G06N 3/08* (2013.01)

(58) Field of Classification Search
CPC .......... G06F 40/20; G06F 40/40; G06F 40/35; G06N 3/02; G06N 3/04; G06N 3/08
See application file for complete search history.

(56) References Cited

U.S. PATENT DOCUMENTS

| 6,434,524 | B1 | 8/2002 | Weber | |
| 8,997,069 | B2 * | 3/2015 | Fanning | G06F 9/54 717/143 |
| 9,336,193 | B2 | 5/2016 | Logan | |

(Continued)

OTHER PUBLICATIONS

Mell et al., "The NIST Definition of Cloud Computing", National Institute of Standards and Technology, Special Publication 800-145, Sep. 2011, pp. 1-7.

*Primary Examiner* — Shaun Roberts
(74) *Attorney, Agent, or Firm* — Robert D. Bean

(57) ABSTRACT

A method, computer system, and a computer program product for generating a conversational bot for an application programming interface (API) is provided. The present invention may include parsing an API schema. The present invention may include generating sentences for the conversational bot from the parsed API schema. The present invention may include constructing the conversational bot by training a deep learning model. The present invention may include receiving a natural language expression from a user. The present invention may include determining whether the natural language expression is enough to activate the bot.

20 Claims, 6 Drawing Sheets

(56) References Cited

U.S. PATENT DOCUMENTS

| | | |
|---|---|---|
| 10,388,285 B2 | 8/2019 | Hirzel |
| 10,446,141 B2 | 10/2019 | Krishnamoorthy |
| 10,679,631 B2 | 6/2020 | Hirzel |
| 2004/0148612 A1 | 7/2004 | Olsen |
| 2012/0311546 A1* | 12/2012 | Fanning .................... G06F 8/75 717/136 |
| 2015/0142704 A1* | 5/2015 | London ............. G06F 16/90332 706/11 |
| 2015/0363171 A1 | 12/2015 | Esfahany |
| 2017/0102925 A1* | 4/2017 | Ali ............................ G06F 8/30 |
| 2018/0131645 A1 | 5/2018 | Magliozzi |
| 2019/0066694 A1* | 2/2019 | Hirzel ...................... G06F 8/30 |
| 2019/0158433 A1 | 5/2019 | Yun |
| 2019/0163830 A1 | 5/2019 | Deluca |
| 2020/0219494 A1* | 7/2020 | Dhoolia .................. G10L 15/16 |
| 2021/0090694 A1* | 3/2021 | Colley ................... G16H 15/00 |

* cited by examiner

GENERATING AND UPDATING CONVERSATIONAL ARTIFACTS FROM APIS

BACKGROUND

The present invention relates generally to the field of computing, and more particularly to conversational systems and automated bot creation.

Traditionally, conversational bots may be manually designed by conversation designers using chatbot authoring tools. This may include the creation of conversational artifacts such as intents, entities, and/or dialog nodes, among other things. This may be a time consuming and cumbersome process, requiring intensive computation and human monitoring of the creation process, and may result in a conversational bot which may be limited in scope. As such, conversational designers have attempted to automate this process by adopting deep learning-based language models (e.g., neural networks) to receive, classify, and/or respond to queries. This may present a new issue in that a conversational bot trained by the deep learning model may behave more unpredictably than a human trained conversational bot.

SUMMARY

Embodiments of the present invention disclose a method, computer system, and a computer program product for generating a conversational bot for an application programming interface (API). The present invention may include parsing an API schema. The present invention may include generating sentences for the conversational bot from the parsed API schema. The present invention may include constructing the conversational bot by training a deep learning model. The present invention may include receiving a natural language expression from a user. The present invention may include determining whether the natural language expression is enough to activate the bot.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
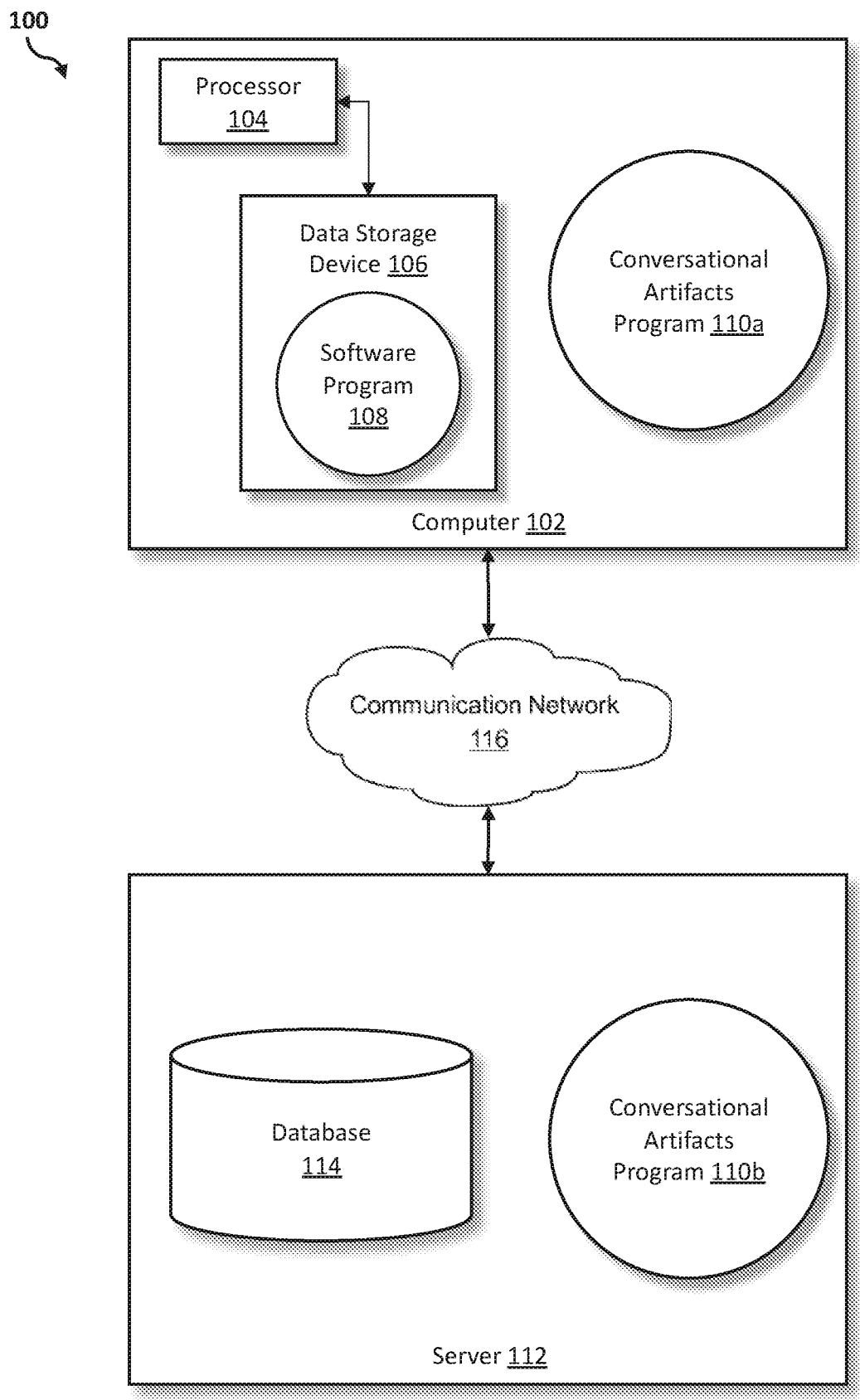
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for generating a conversational bot for an application programming interface (API). As such, the present embodiment has the capacity to improve the technical field of conversational systems and automated bot creation by automatically creating conversational artifacts using conversational feedback to improve a natural language understanding (NLU) and/or natural language generation (NLG) platform, and further running an application programming interface (API) using a conversational interface. More specifically, the present invention may include parsing an API schema. The present invention may include generating sentences for the conversational bot from the parsed API schema. The present invention may include constructing the conversational bot by training a deep learning model. The present invention may include receiving a natural language expression from a user. The present invention may include determining whether the natural language expression is enough to activate the bot.

As described previously, traditionally, conversational bots may be manually designed by conversation designers using chatbot authoring tools. This may include the creation of conversational artifacts such as intents, entities, and/or dialog nodes, among other things. This may be a time consuming and cumbersome process, requiring intensive computation and human monitoring of the creation process, and may result in a conversational bot which may be limited in scope. As such, conversational designers have attempted to automate this process by adopting deep learning-based language models (e.g., neural networks) to receive, classify, and/or respond to queries. This may present a new issue in that a conversational bot trained by the deep learning model may behave more unpredictably than a human trained conversational bot. Further, deep learning models may not allow users to utilize a conversational interface to annotate natural language sentences and/or other artifacts which may be used to retrain the natural language model.

Therefore, it may be advantageous to, among other things, automatically create conversational artifacts by using conversational feedback to improve a natural language understanding (NLU) and/or natural language generation (NLG) platform, and further run an application programming interface (API) using a conversational interface.

According to at least one embodiment, the present invention may reduce the overhead for conversational agent creation in IBM Watson® (Watson and all Watson-based trademarks are trademarks or registered trademarks of International Business Machines Corporation in the United States, and/or other countries) by enabling the automatic ingestion of an API and the creation of a conversational interface on top of the API.

According to at least one embodiment, the present invention may generate natural language (NL) artifacts using a generation component to introspect an API and to generate an NL interface. The generation component may also be used in an authoring environment to generate the same information into an artifact that may then be used to generate the API specification which includes the NL metadata. By integrating the generation of NL artifacts into the tooling, this may allow the end user that authors the service to further refine the generated NL interface.

According to at least one embodiment, the present invention may collect feedback from users and may retrain the model based on the collected feedback. Feedback may be collected when users type in utterances into the conversational interface running on top of the API that end up in a fallback situation (e.g., "I did not understand your phrase."). These failed sentences may be evaluated to detect a similarity of the sentences to other sentences and the model may be updated and trained accordingly.

According to at least one embodiment, the present invention may detect a failure based on different signals, may identify a successful utterance in a session, may compute a similarity score relying on different types of similarity measures, and may proceed with training the API automatically based on meeting a predefined threshold. In instances where the predefined threshold may not be met, the present invention may refer to the user for validation and final approval before the system may proceed with training the model.

According to at least one embodiment, the present invention may generate conversational interfaces to APIs by allowing users to annotate the API, using annotations (if any) to generate NL sentences and other artifacts which may be used for training an NLU model, and using conversational feedback to improve the training of the NLU model.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a conversational artifacts program 110a. The networked computer environment 100 may also include a server 112 that is enabled to run a conversational artifacts program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the conversational artifacts program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the conversational artifacts program 110a, 110b (respectively) to allow users to utilize a conversational interface to annotate natural language sentences and/or other artifacts which may be used to retrain a natural language model. The conversational artifacts method is explained in more detail below with respect to FIGS. 2 and 3.

Figure 2:
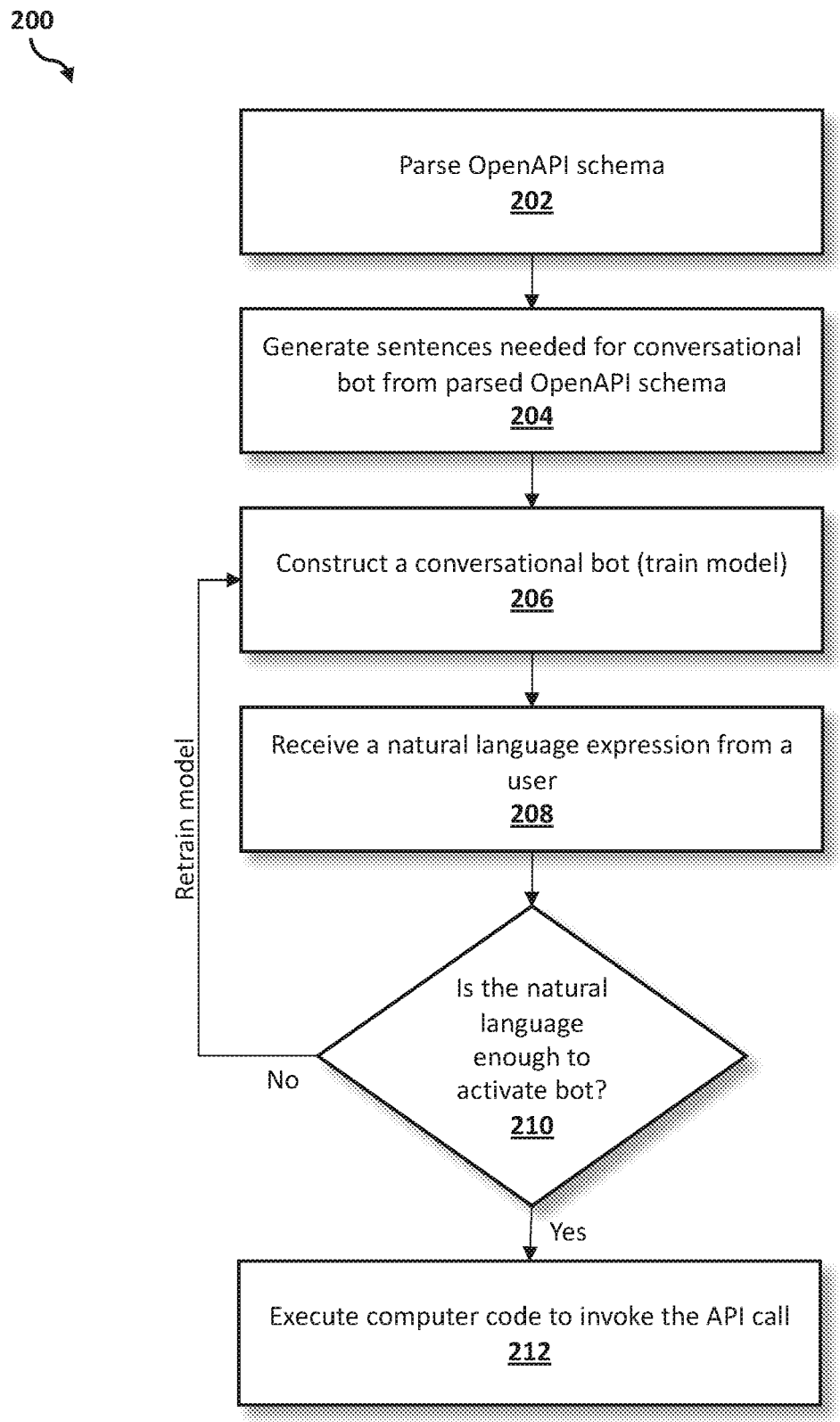
FIG. 2 is an operational flowchart illustrating a process for automatically generating a conversational bot for an application programming interface (API) according to at least one embodiment.

Referring now to FIG. 2, an operational flowchart illustrating the exemplary process 200 for automatically generating a conversational bot for an application programming interface (API) according to at least one embodiment is depicted. The method may be executed by one or more hardware processors, for example, as described with reference to the components shown in FIG. 1.

At 202, the conversational artifacts program 110a and 110b parses an OpenAPI schema. OpenAPI may be an open-source specification used to design and create machine-readable interface files utilized in describing, producing, consuming, and visualizing RESTful APIs and web services. The OpenAPI specification may allow both humans and computers to discover and understand capabilities of a service without requiring access to source code, or inspection of network traffic, among other things.

As here, the OpenAPI schema may be parsed (e.g., by running a script to do same and to create a conversational interface) so that artifacts may be pulled from the OpenAPI specification, wherein the OpenAPI specification may be a HyperText Markup Language (HTML) file that has information related to an API endpoint. Inside the OpenAPI schema there may be a set of descriptions and a summary of what the API does (e.g., which may be identified when the OpenAPI schema is parsed). For example, the description within the OpenAPI may indicate that the program is for "Approving a quote."

Parsing the OpenAPI schema may allow the conversational artifacts program 110a and 110b to generate any parameters and a description of the API. For example, the conversational artifacts program 110a and 110b may generate IBM Watson® Assistant (Watson and all Watson-based trademarks are trademarks or registered trademarks of International Business Machines Corporation in the United States, and/or other countries) workspace artifacts (e.g., intent, slots, parameters, etc.) which may be necessary for the conversational system to execute correctly. This may include artifacts which may enable the conversational artifacts program 110a and 110b to utilize a paraphrasing language model to obtain variants of intents and parameters, among other things (e.g., input and output parameters which may need to be provided to the OpenAPI) to train an intent classification model to generate sentences.

It is important to note that IBM Watson® Assistant is merely an example and the same artifacts (e.g., intents, example phrases, etc.) may be generated for other chatbot authoring tools which may be similar to IBM Watson® Assistant (e.g., authoring tools which require intents and examples to train intent classification models). It is also important to note that OpenAPI is merely an example and other API implementations (e.g., asyncAPI, REST, Web Services) may be used.

A quality check on the description of the parsed OpenAPI schema is described in more detail with respect to FIG. 3 below.

At 204, sentences are generated which may be needed for a conversational bot from the parsed OpenAPI schema. To determine which sentences may be needed for the conversational bot from the parsed OpenAPI schema, sentences may be evaluated using a similarity metric to determine how similar the sentences are to a seed sentence and/or a phrase. Additionally, a human user may filter generated sentences to remove any sentences which may not be of good quality and/or relevance. Sentences may be generated here for intent classification using an ensemble of methods, and further using sentence embeddings to pick the best sentences. For example, IBM Watson® Assistant API may be used to create the workspace and sentences.

Once the description is parsed, as described previously with respect to step 202 above, the system may use deep learning models to generate sentences (e.g., using IBM Watson® Assistant or any Natural Language Understanding (NLU) classifier). Sentences may alternatively or additionally be generated using a template (e.g., by taking a small sentence and putting a prefix and/or a suffix before and after the sentence), or using a structure (e.g., by identifying a sentence or a phrase using a context free grammar technique, including identifying a verb, an object, and/or a subject, and replacing any of the identified verb, object and/or subject with something else in order to generate another sentence). However, the most effective method may be generating sentences using generic deep learning models (e.g., machine translation methods and/or abstract meaning representation methods to parse and generate different types of sentences, such as Bird AI, T5, and GPT, among other models). Any method in which a prefix and/or a suffix may be placed around a question may be used here for sentence generation. At this step, many sentences may be generated with the goal being keeping sentences together which are similar. To do this, different similarity methods may be used to detect sentences which are similar to one other based on a certain threshold, and to drop dissimilar sentences.

At 206, a conversational bot is constructed, and the model (e.g., the deep learning model described with respect to step 204 above) is trained. Authoring tools such as IBM Watson® Assistant may construct a conversational bot by taking user input (e.g., intent names and/or intent examples) into the tool and using the inputted user data to train an intent classifier. By way of example, the conversational bot may be a finite state machine which includes a plurality of states and state transitions, and which specifies a dialogue flow for the conversational bot.

The model may be trained and retrained each time new utterances are added to a database utilized by the model. In instances where a failure is detected for an utterance u (e.g., a fallback agent is selected or a thumbs down is received from a user, among other things), the model (e.g., which is functioning as the backend of the conversational bot) may look for a successful utterances U' in the same session as u. A database comprising a history of utterances and orchestrator logs may be used to find additional utterances U'. Then, for every u' in U', a similarity score such as f (u, u') may be computed to determine whether to add u as a sample for intent I (u'). Temporal similarity (e.g., determining whether the utterances were issued around the same time), syntactic similarity (e.g., determining whether the edit distance is close), semantic similarity (e.g., determining whether there are similar text embeddings or AMR tree, BLEU metric), and/or agent confidence similarity (e.g., determining a difference in distribution of agent scores) may be computed either alone or in combination. If the computed similarity score is determined to be high, then the u may automatically be added as a sample intent I (u') and the classifier may be retrained. If, alternatively, the computed similarity score is determined to be medium (on a high-medium-low scale), then u may be marked as a possible sample intent I (u'), with confirmation required by a human user. Confirmation may be received from the user, for example, at step 208 below.

At 208, a natural language expression is received from a user. A natural language expression may be a text expression or an utterance or audible speech received from a user. The natural language expression may be transformed into instructions to be used by the conversational artifacts program 110a and 110b. That is, the natural language expression may first be transformed into symbols, and the symbols may then be transformed into instructions for generating a natural language prompt to the user and/or executable computer code for invoking an API call.

For example, in a conversational interface on top of IBM's Digital Business Automation API, a user may type "fetch approval."

At 210, it is determined whether the natural language is enough to activate the conversational bot. The determination here may be made based on the use of similarity metrics, to determine whether a provided natural language expression is similar to a recognized phrase. If the natural language is not enough to activate the conversational bot, then the model is retrained as described previously with respect to step 206 above. If the natural language is enough to activate the conversational bot, then at 212, the computer code is executed to invoke the API call.

Continuing with the above example, the system may not recognize the user's utterance of "fetch approval" (e.g., the sentence fails) and the system may reply with "Sorry, I fail to understand what you mean, can you rephrase your question?" The user may thereafter change the sentence to state, "get quote approval from approver." The sentence may now be understood by the system and the initial "fetch approval" may be automatically added to the training sentences so that the system may recognize that the two sentences (e.g., the initial sentence and the modified sentence) are related. The model may be trained (e.g., as described previously with respect to step 206 above) using the updated sentences.

Figure 3:
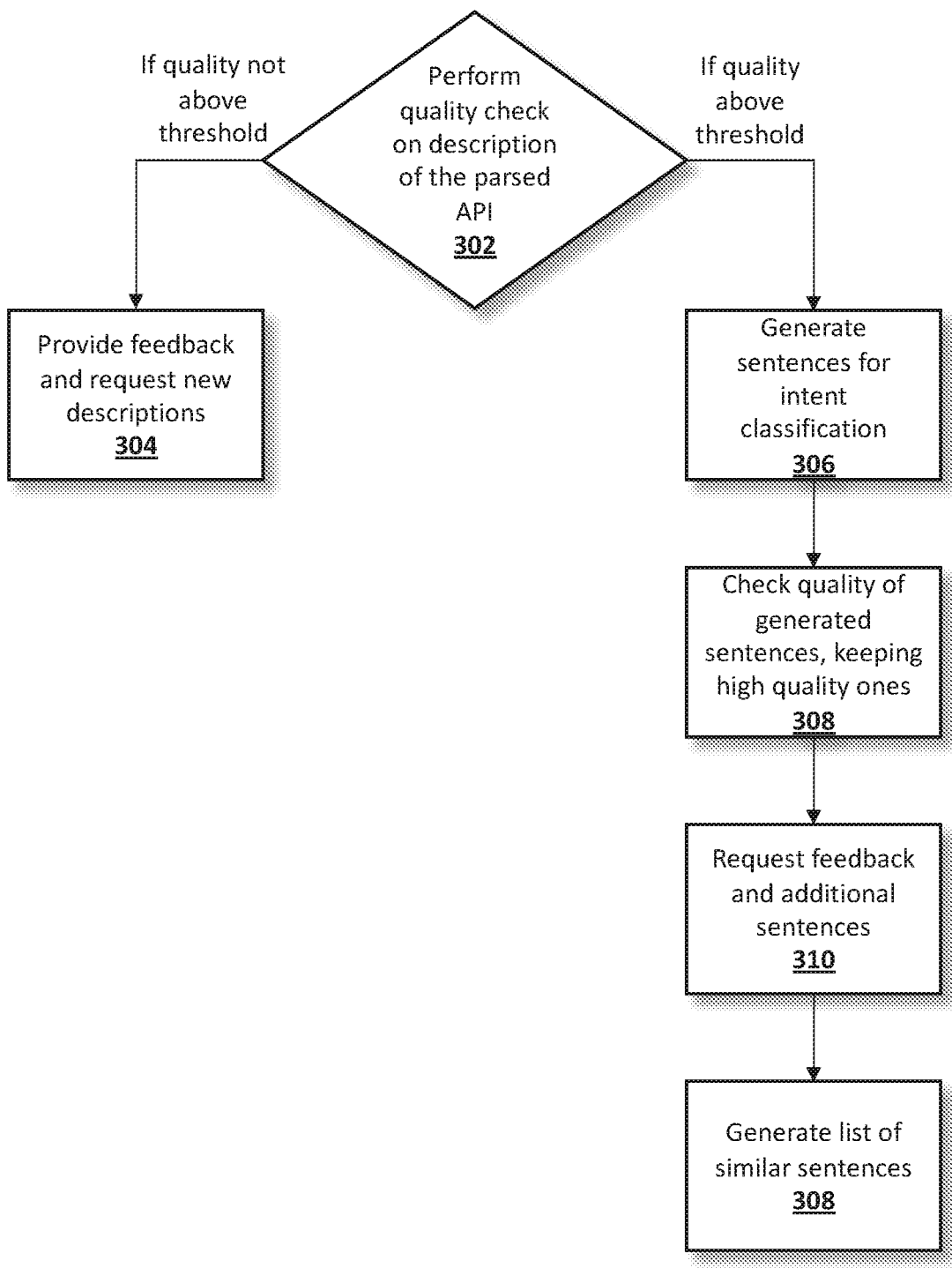
FIG. 3 is an operational flowchart illustrating a process for performing a quality check on a description of a parsed API according to at least one embodiment.

Referring now to FIG. 3, an operational flowchart illustrating the exemplary process 300 for performing a quality check on a description of a parsed API according to at least one embodiment is depicted.

At 302, a determination is made as to quality of the description of the parsed API. The quality check performed on the description of the parsed API includes one or more of the following: a check of action words and/or phrases which may be relevant to a business domain, and a check for sufficient differentiation from other bootstrapped APIs. A particular domain may be determined based on the parsed description of the OpenAPI.

If the quality is determined to not be above a defined threshold (e.g., which threshold may be defined manually by a user at the outset and which may be eventually learned by the system through user feedback), then at 304, feedback is provided to a user (e.g., an admin user) and new descriptions and/or sample utterances are requested (e.g., as described previously with respect to steps 206 and 208 above).

For example, the user may type a sentence into a conversational interface on top of an API. That sentence may result in a failure because the model was not trained for that sentence, or the system may have been unable to detect what was said as part of a given classification (e.g., based on a determined description of the parsed API). Based on the failure, the user may perform an additional action. This may include correcting the sentence (e.g., "I want to submit a code," initially stated by the user, may turn into "I want to create a code"). Similarly, the system may detect a failure based on a user's thumbs up or thumbs down, or based on user provided feedback in another form. Once the user provides a modified sentence/utterance, the system may be able to detect that new sentence or utterance and compare it to other successful utterances. Success may be determined in terms of similarity and there may be different methods of computing similarity. Execution (e.g., where it can be seen using a log that the agent was successful) or other users' feedback may be several indicators of success. When something fails, the system may also see a user's statement which reads, "I don't understand what you mean." The definition of success may be based on a similarity score being above a particular threshold, and may include detecting a failure, detecting a thumbs up or thumbs down, and/or utilizing indicators to compare past failures. A successful call of the agent may be mapped to an utterance, and based on certain similarities, a determination may be made to add a particular sentence (e.g., that the user created) to a database used to train the model. If a high similarity score is achieved, then the sentence may be automatically added to the model and the system may call the API. Otherwise, a human user may be asked to confirm whether the sentence is suitable to be sent for training.

If the quality is determined to be above the defined threshold, then at 306, sentences are generated for intent classification (e.g., using an intent classification model to generate sentences). Sentences may be generated using an ensemble of methods (e.g., including template-based, structure-based, and deep learning models, as described previously with respect to step 204 above).

Then, at 308, a quality of generated sentences is checked, keeping only high-quality sentences. This may be done using the similarity metrics described previously with respect to step 210 above.

Next, at 310, feedback and additional sentences are requested. At least a subset of the sentences generated with respect to step 306 above (e.g., sentences which may form cluster centers in an embedded space) may be provided to the admin for feedback. A subset of sentences may exist, for example, because of the many different variations of sentences used to describe the same thing. All of the variations may belong to the same intent, for intent classification purposes, but some of the variations may be more similar to each other while others may be more dissimilar. Similar sentences, such as "set my alarm for 6 am" and "configure my alarm to 6 am," may be grouped together in the same cluster of an intent while dissimilar sentences, such as "wake me up at 6 am," may be in a different cluster. Again, both clusters may belong to the same intent.

In the DBA example as above, additional sentences may also be requested from a Verdi Admin.

Lastly, at 312, a list of similar sentences is generated.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
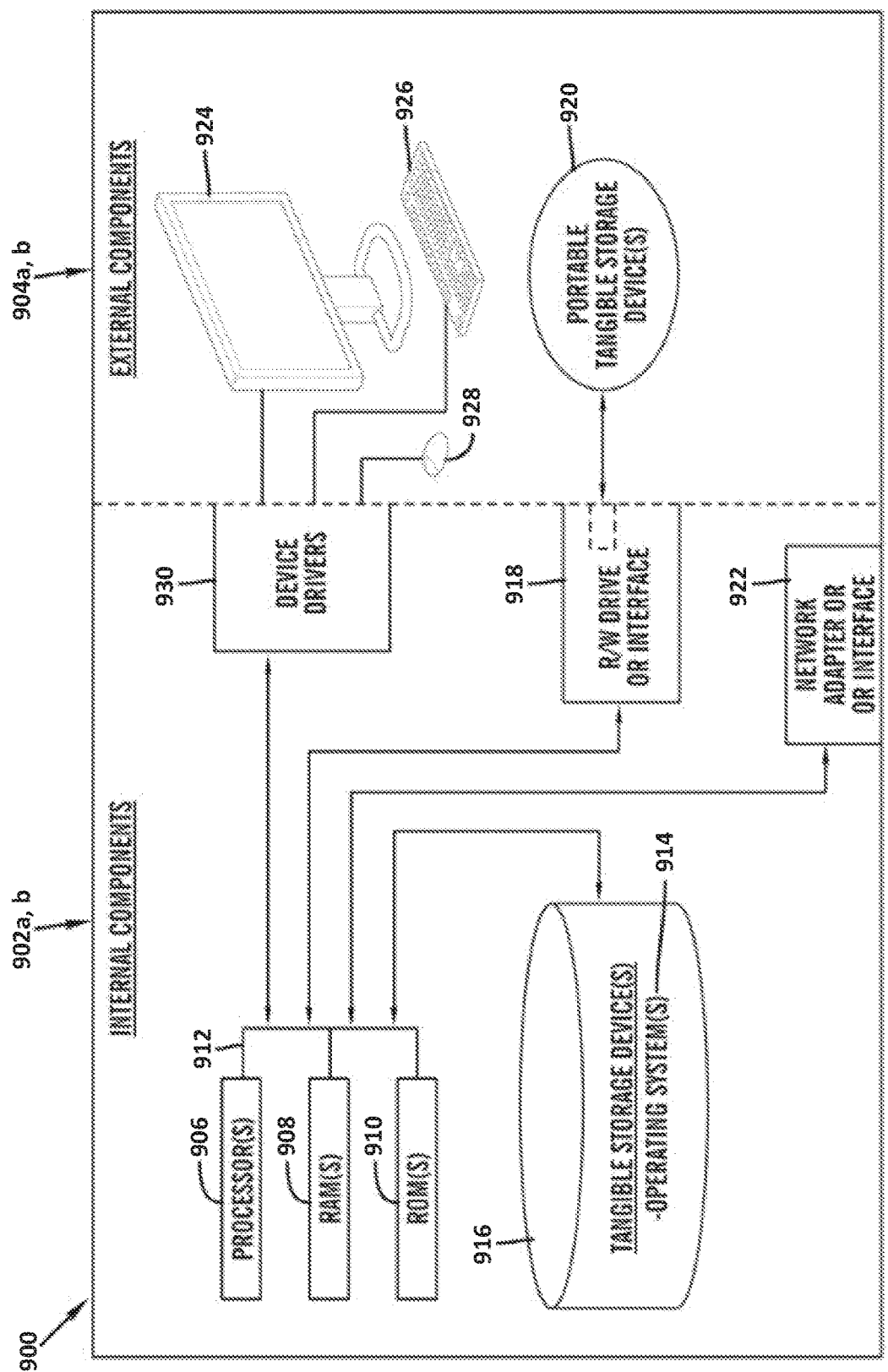
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the conversational artifacts program 110a in client computer 102, and the conversational artifacts program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the conversational artifacts program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the conversational artifacts program 110a in client computer 102 and the conversational artifacts program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the conversational artifacts program 110a in client computer 102 and the conversational artifacts program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
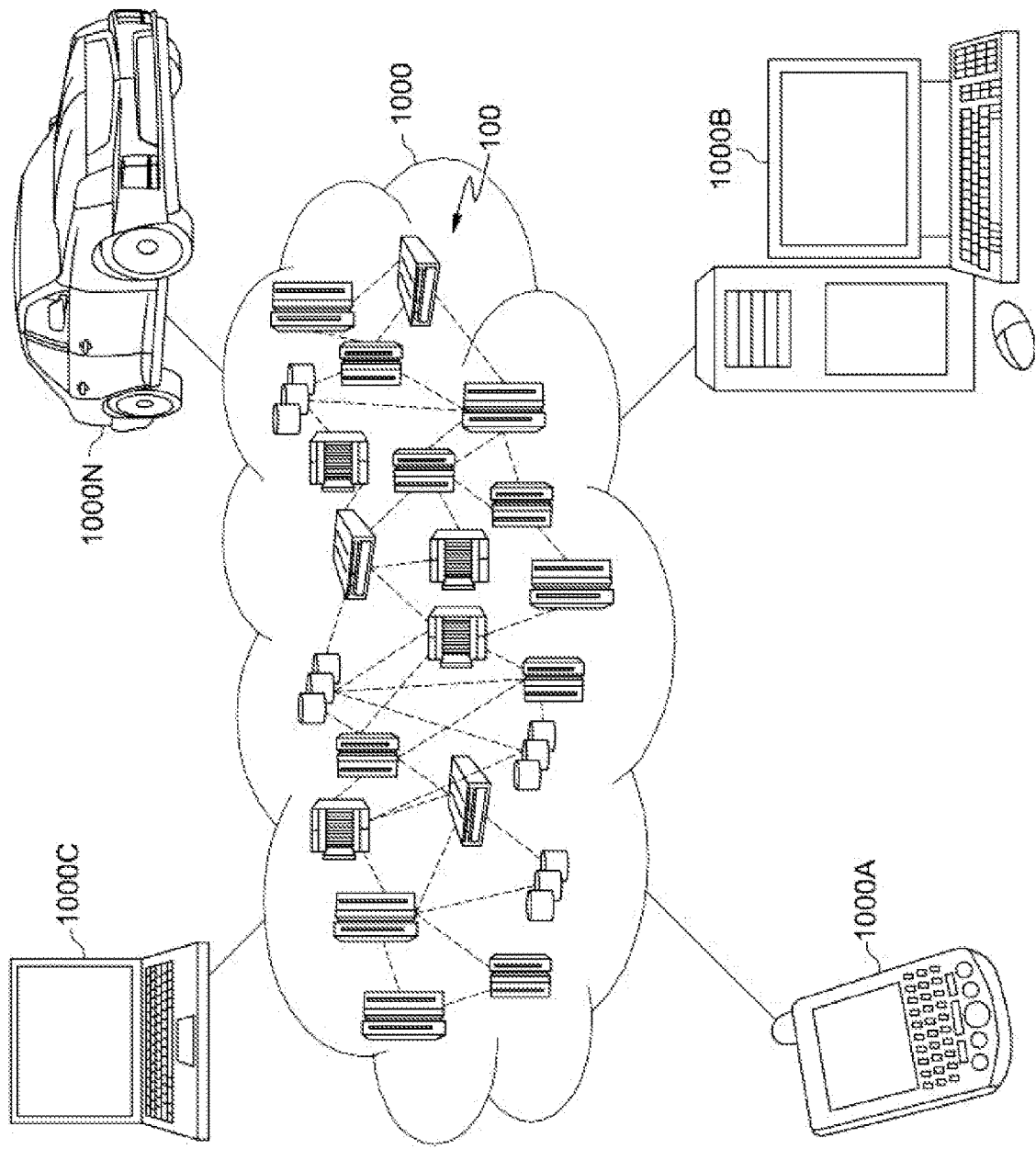
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
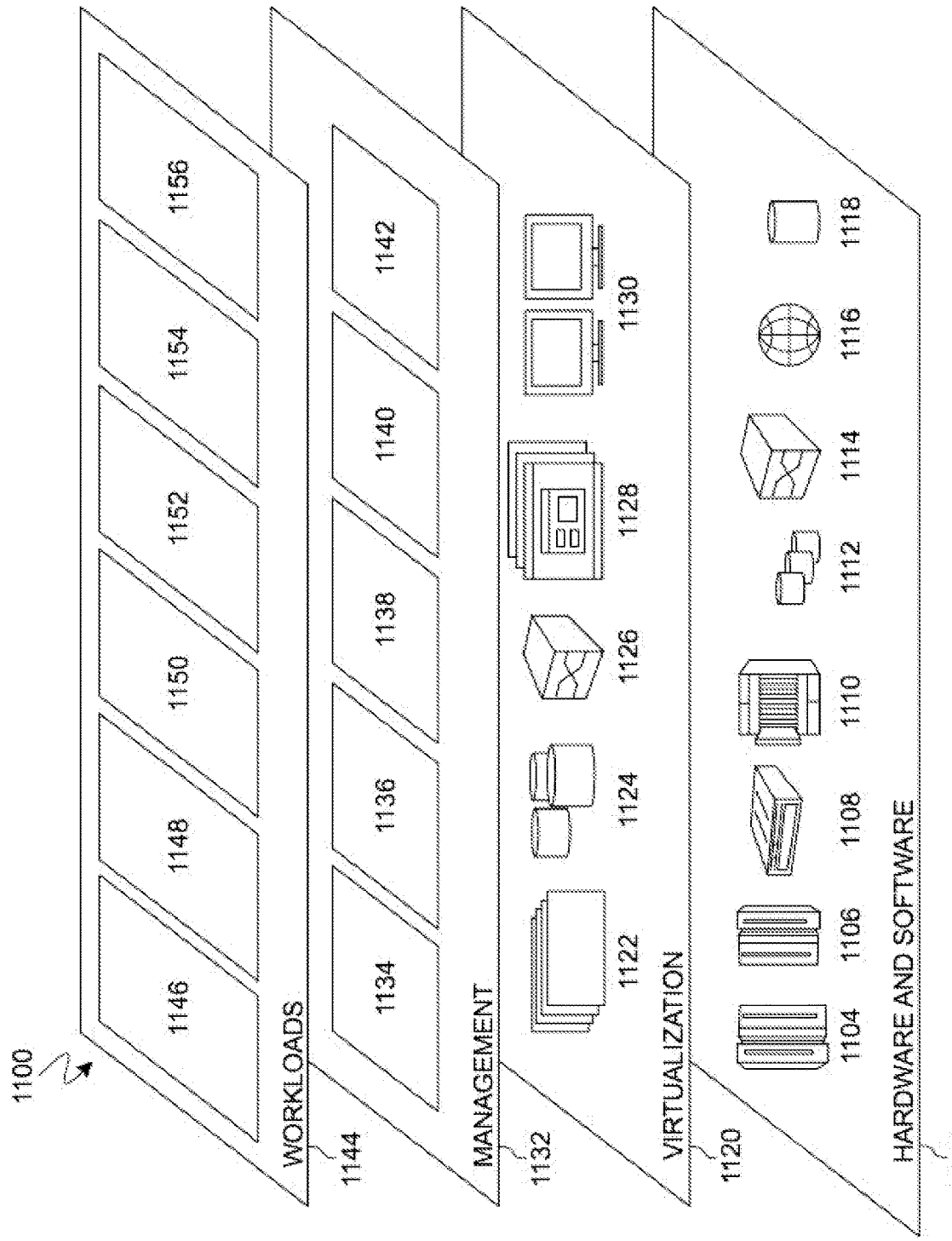
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and conversational artifacts 1156. A conversational artifacts program 110a. 110b provides a way to utilize a conversational interface to annotate natural language sentences and/or other artifacts which may be used to retrain the natural language model.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating a conversational bot for an application programming interface (API), the method comprising:

parsing an API schema to extract a plurality of artifacts;

training a deep learning model to generate a plurality of sentences comprising a conversational bot using a plurality of variants of intents and parameters comprising the extracted artifacts;

constructing, by the trained deep learning model, the conversational bot by generating the plurality of sentences;

receiving a natural language expression from a user;

determining whether the natural language expression is enough to activate the bot; and responsive to determining that the natural language expression is not enough to activate the bot:

retrieving one or more successful utterances from a same session as the natural language expression;

determining a similarity of one or more of the retrieved successful utterances to the natural language expression;

responsive to the similarity of one or more of the retrieved successful utterances exceeding a threshold level, adding the one or more natural language expressions as a sample intent; and retraining the deep learning model with the sample intent.

2. The method of claim 1, wherein parsing the API schema further comprises:

identifying a set of descriptions and a summary of what the API does.

3. The method of claim 1, wherein the sentences are generated for the conversational bot from the parsed API schema using an ensemble of methods.

4. The method of claim 1, wherein the natural language expression received from the user is a text expression, an utterance or an audible speech.

5. The method of claim 1, wherein it is determined that the natural language expression is not enough to activate the bot, further comprising:

receiving feedback from the user;

determining a similarity between the received feedback and at least one successful utterance;

associating the natural language expression with the at least one successful utterance in a database; and retraining the deep learning model.

6. The method of claim 1, wherein the natural language expression is received in a conversational interface on top of the API.

7. The method of claim 1, wherein it is determined that the natural language expression is enough to activate the bot, further comprising:

executing a computer code to invoke an API call.

8. A computer system for generating a conversational bot for an application programming interface (API), comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
- parsing an API schema to extract a plurality of artifacts;
- training a deep learning model to generate a plurality of sentences comprising a conversational bot using a plurality of variants of intents and parameters comprising the extracted artifacts;
- constructing, by the trained deep learning model, the conversational bot by generating the plurality of sentences;
- receiving a natural language expression from a user;
- determining whether the natural language expression is enough to activate the bot; and
- responsive to determining that the natural language expression is not enough to activate the bot:
  - retrieving one or more successful utterances from a same session as the natural language expression;
  - determining a similarity of one or more of the retrieved successful utterances to the natural language expression;
  - responsive to the similarity of one or more of the retrieved successful utterances exceeding a threshold level, adding the one or more natural language expressions as a sample intent; and
  - retraining the deep learning model with the sample intent.

9. The computer system of claim 8, wherein parsing the API schema further comprises:
identifying a set of descriptions and a summary of what the API does.

10. The computer system of claim 8, wherein the sentences are generated for the conversational bot from the parsed API schema using an ensemble of methods.

11. The computer system of claim 8, wherein the natural language expression received from the user is a text expression, an utterance or an audible speech.

12. The computer system of claim 8, wherein it is determined that the natural language expression is not enough to activate the bot, further comprising:
- receiving feedback from the user;
- determining a similarity between the received feedback and at least one successful utterance;
- associating the natural language expression with the at least one successful utterance in a database; and
- retraining the deep learning model.

13. The computer system of claim 8, wherein the natural language expression is received in a conversational interface on top of the API.

14. The computer system of claim 8, wherein it is determined that the natural language expression is enough to activate the bot, further comprising:
executing a computer code to invoke an API call.

15. A computer program product for generating a conversational bot for an application programming interface (API), comprising:
one or more non-transitory computer-readable storage media and program instructions stored on at least one of the one or more tangible storage media, the program instructions executable by a processor to cause the processor to perform a method comprising:
- parsing an API schema to extract a plurality of artifacts;
- training a deep learning model to generate a plurality of sentences comprising a conversational bot using a plurality of variants of intents and parameters comprising the extracted artifacts;
- constructing, by the trained deep learning model, the conversational bot by generating the plurality of sentences;
- receiving a natural language expression from a user;
- determining whether the natural language expression is enough to activate the bot; and
- responsive to determining that the natural language expression is not enough to activate the bot:
  - retrieving one or more successful utterances from a same session as the natural language expression;
  - determining a similarity of one or more of the retrieved successful utterances to the natural language expression;
  - responsive to the similarity of one or more of the retrieved successful utterances exceeding a threshold level, adding the one or more natural language expressions as a sample intent; and
  - retraining the deep learning model with the sample intent.

16. The computer program product of claim 15, wherein parsing the API schema further comprises:
identifying a set of descriptions and a summary of what the API does.

17. The computer program product of claim 15, wherein the sentences are generated for the conversational bot from the parsed API schema using an ensemble of methods.

18. The computer program product of claim 15, wherein the natural language expression received from the user is a text expression, an utterance or an audible speech.

19. The computer program product of claim 15, wherein it is determined that the natural language expression is not enough to activate the bot, further comprising:
- receiving feedback from the user;
- determining a similarity between the received feedback and at least one successful utterance;
- associating the natural language expression with the at least one successful utterance in a database; and
- retraining the deep learning model.

20. The computer program product of claim 15, wherein it is determined that the natural language expression is enough to activate the bot, further comprising:
executing a computer code to invoke an API call.

* * * * *